United States Patent
Harmsen et al.

(10) Patent No.: US 9,540,985 B2
(45) Date of Patent: Jan. 10, 2017

(54) ARRANGEMENT FOR EXHAUST-GAS AFTERTREATMENT SYSTEM FOR AN INTERNAL COMBUSTION ENGINE AND METHOD FOR OPERATING THE EXHAUST-GAS AFTERTREATMENT SYSTEM ARRANGEMENT

(71) Applicant: Ford Global Technologies, LLC, Dearborn, MI (US)

(72) Inventors: Jan Harmsen, Simpelveld (NL); Frank Linzen, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 85 days.

(21) Appl. No.: 14/297,067

(22) Filed: Jun. 5, 2014

(65) Prior Publication Data

US 2015/0000255 A1  Jan. 1, 2015

(30) Foreign Application Priority Data

Jul. 1, 2013  (DE) .......................... 10 2013 212 801

(51) Int. Cl.
*F01N 3/00* (2006.01)
*F01N 13/00* (2010.01)
*F01N 3/08* (2006.01)

(52) U.S. Cl.
CPC .......... *F01N 13/009* (2014.06); *F01N 3/0821* (2013.01); *F01N 3/0842* (2013.01); *F01N 3/0878* (2013.01);

(Continued)

(58) Field of Classification Search
CPC ....................................................... F01N 3/18
(Continued)

(56) References Cited

U.S. PATENT DOCUMENTS

| | | | |
|---|---|---|---|
| 4,817,385 A | 4/1989 | Kumagai | |
| 5,406,790 A * | 4/1995 | Hirota et al. ................... | 60/276 |

(Continued)

FOREIGN PATENT DOCUMENTS

| | | |
|---|---|---|
| DE | 19626837 A1 | 1/1997 |
| DE | 19740702 C1 | 11/1998 |

(Continued)

*Primary Examiner* — Thomas Denion
*Assistant Examiner* — Matthew T Largi
(74) *Attorney, Agent, or Firm* — Julia Voutyras; Alleman Hall McCoy Russell & Tuttle LLP

(57) ABSTRACT

A method for operating an exhaust-gas aftertreatment system arrangement is provided. The method includes in a first operating state, flowing a substantial majority of an exhaust-gas stream from the internal combustion engine through a first $NO_x$ storage catalytic converter positioned in a main exhaust branch of an exhaust aftertreatment system arrangement and in a second operating state, flowing a substantial majority of the exhaust-gas stream through a first bypass branch branching off from the main exhaust branch upstream of the first $NO_x$ storage catalytic converter and which opens into the main exhaust branch downstream of the first $NO_x$ storage catalytic converter and regenerating the first $NO_x$ storage catalytic converter.

15 Claims, 3 Drawing Sheets

(52) U.S. Cl.
CPC ......... *F01N 3/0885* (2013.01); *F01N 13/0093* (2014.06); *F01N 2610/03* (2013.01)

(58) Field of Classification Search
USPC .......................................... 60/288, 299, 324
See application file for complete search history.

(56) References Cited

U.S. PATENT DOCUMENTS

| | | | |
|---|---|---|---|
| 6,742,328 B2 * | 6/2004 | Webb et al. | 60/285 |
| 6,883,311 B2 | 4/2005 | Liu | |
| 7,062,905 B2 * | 6/2006 | Khair et al. | 60/295 |
| 7,472,545 B2 | 1/2009 | Hemingway et al. | |
| 8,037,674 B2 | 10/2011 | Kupe et al. | |
| 8,136,345 B2 * | 3/2012 | Liu et al. | 60/286 |
| 2006/0010857 A1 * | 1/2006 | Hu et al. | 60/286 |
| 2006/0168948 A1 | 8/2006 | Xu et al. | |
| 2007/0044454 A1 * | 3/2007 | Bonadies et al. | F01N 3/0253 60/289 |
| 2007/0271908 A1 * | 11/2007 | Hemingway et al. | 60/286 |
| 2010/0132335 A1 * | 6/2010 | Theis | 60/286 |
| 2013/0202507 A1 * | 8/2013 | Echoff et al. | 423/213.5 |

FOREIGN PATENT DOCUMENTS

| | | |
|---|---|---|
| DE | 10346345 A1 | 4/2005 |
| EP | 1450016 A1 | 8/2004 |

\* cited by examiner

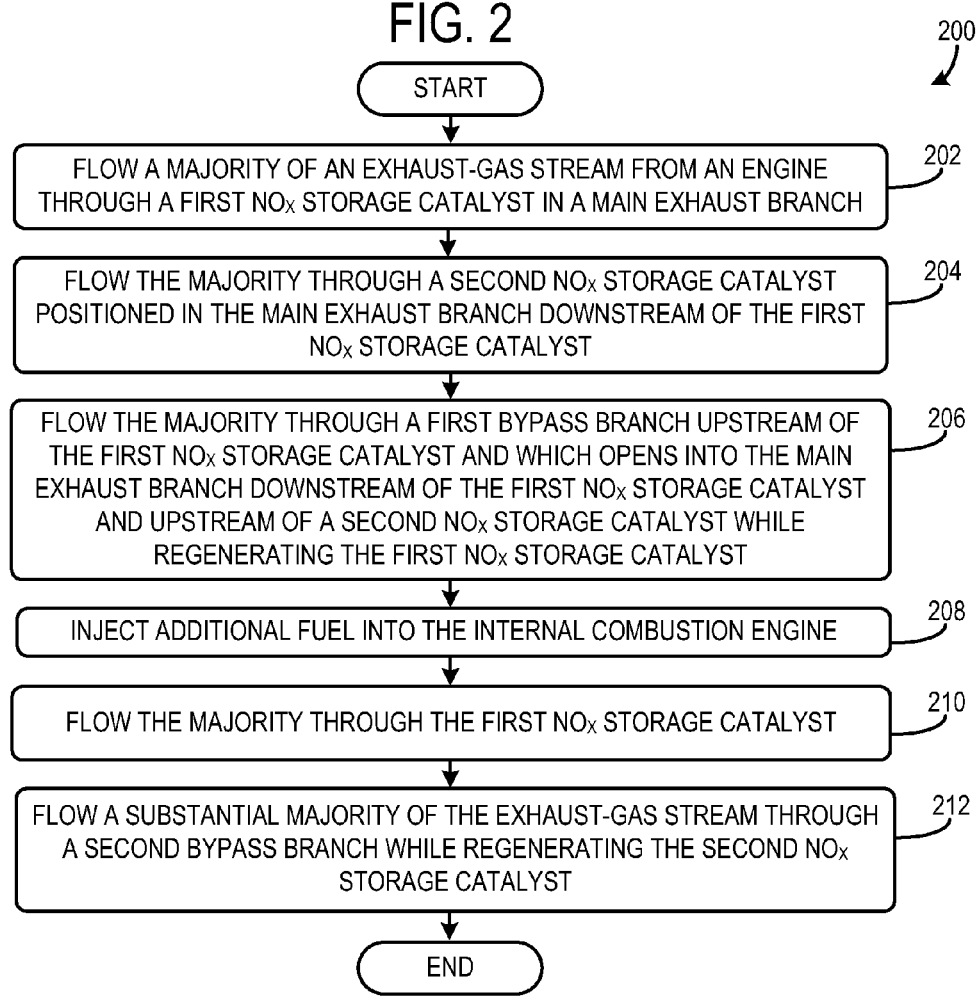

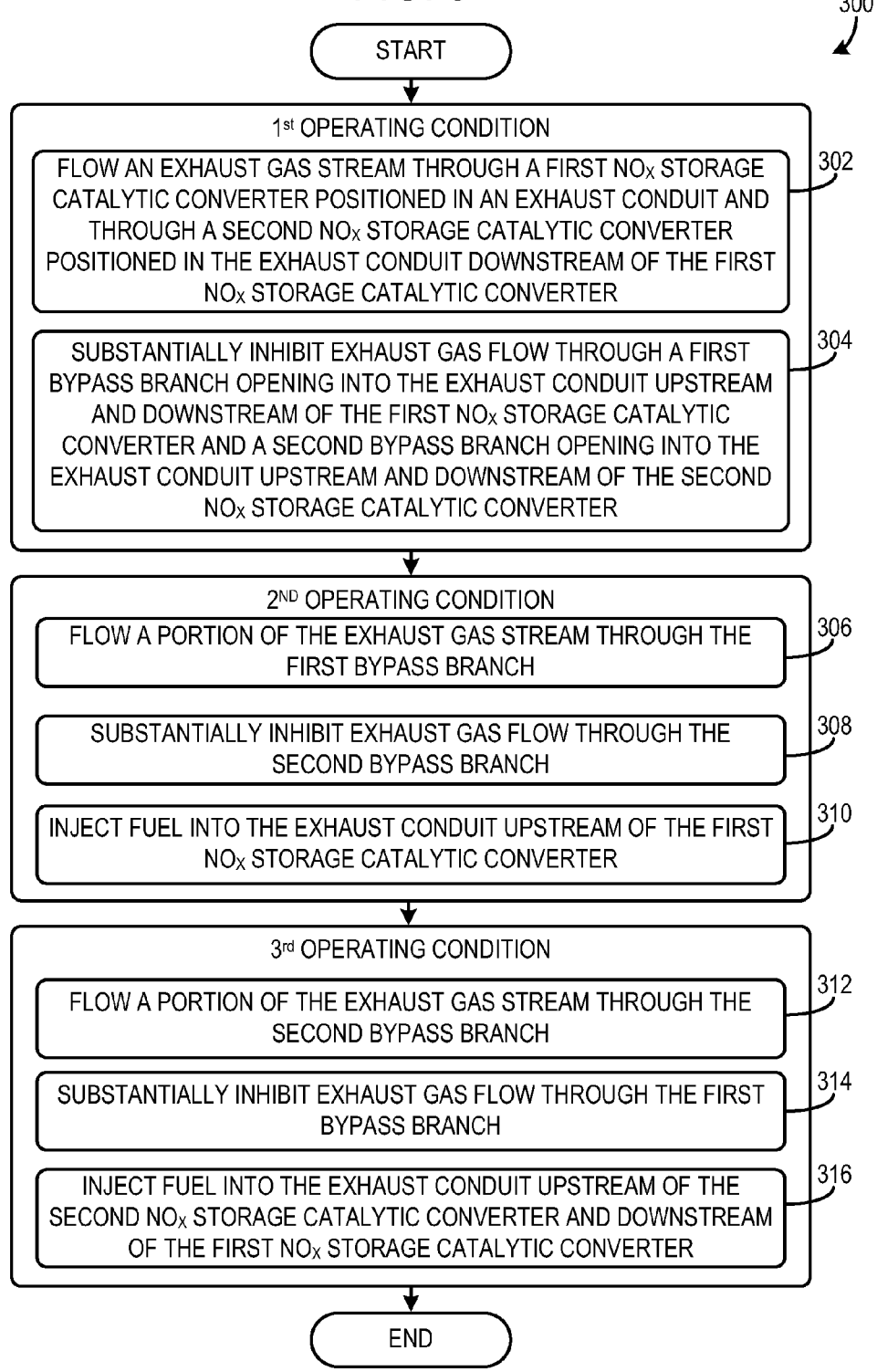

ARRANGEMENT FOR EXHAUST-GAS AFTERTREATMENT SYSTEM FOR AN INTERNAL COMBUSTION ENGINE AND METHOD FOR OPERATING THE EXHAUST-GAS AFTERTREATMENT SYSTEM ARRANGEMENT

CROSS REFERENCE TO RELATED APPLICATIONS

This application claims priority to German Patent Application No. 102013212801.0, filed Jul. 1, 2013, the entire contents of which are hereby incorporated by reference for all purposes.

FIELD

The present disclosure relates to an arrangement for an exhaust-gas aftertreatment system for an internal combustion engine and a method for operating the arrangement.

BACKGROUND AND SUMMARY

Internal combustion engines may generate considerable amounts of nitrogen oxides ($NO_x$) during operation. In the case of diesel and gasoline lean-burn engines used in motor vehicles, the amounts of nitrogen oxide in the exhaust gas are generally higher than the admissible limit values, such that exhaust-gas aftertreatment is desired in order to reduce the $NO_x$ emissions. In one prior art method, an SCR (Selective Catalytic Reduction) catalytic converter is used for reducing the $NO_x$ emissions. For the conversion of the nitrogen oxides by an SCR catalytic converter into non-hazardous substances, a supply of ammonia ($NH_3$) may be needed, for example by way of an injection of a urea solution into the exhaust-gas stream. In another widely used method, use is made of a $NO_x$ storage catalytic converter (Lean $NO_x$ Trap, LNT) which absorbs and stores the nitrogen oxides contained in the exhaust gas of the internal combustion engine. A regeneration of the $NO_x$ storage catalytic converter must be performed from time to time, for which purpose it is necessary for an excess of fuel to be generated in the exhaust gas that is conducted through the $NO_x$ storage catalytic converter, which entails an additional consumption of fuel. Thus, both for the operation of an SCR catalytic converter and also of a $NO_x$ storage catalytic converter, additional costs are incurred owing to the needed provision of ammonia and of additional fuel.

U.S. Pat. No. 7,472,545 B2 for discloses an exhaust-gas aftertreatment system of an internal combustion engine including a $NO_x$ storage catalytic converter which is followed by an SCR catalytic converter. If fuel reformate is supplied to the $NO_x$ storage catalytic converter for regeneration purposes, the exhaust-gas stream is conducted past the $NO_x$ storage catalytic converter, via a bypass branch that is connected in parallel with respect to the latter, directly to the SCR catalytic converter. However, the inventors have recognized several drawbacks with the exhaust gas aftertreatment system disclosed in U.S. Pat. No. 7,472,545. For instance, during regeneration of the $NO_x$ storage catalytic converter engine emissions are increased. Moreover, regeneration of the $NO_x$ storage catalytic converter engine may only be implemented during engine operating conditions when the engine is operating at a desirable speed and/or load, thereby limiting regeneration of the $NO_x$ storage catalytic converter As such in one approach, a method for operating an exhaust-gas aftertreatment system arrangement is provided. The method includes in a first operating state, flowing a majority of an exhaust-gas stream from the internal combustion engine through a first $NO_x$ storage catalytic converter positioned in a main exhaust branch of an exhaust aftertreatment system arrangement and in a second operating state, flowing a majority of the exhaust-gas stream through a first bypass branch branching off from the main exhaust branch upstream of the first $NO_x$ storage catalytic converter and which opens into the main exhaust branch downstream of the first $NO_x$ storage catalytic converter and upstream of a second $NO_x$ storage catalytic converter and regenerating the first $NO_x$ storage catalytic converter.

In this way, the first $NO_x$ storage catalytic converter may be regenerated while exhaust gas is directed around the $NO_x$ storage catalytic converter and then flowed into the second $NO_x$ storage catalytic converter, to reduce emissions during regeneration of the first $NO_x$ storage catalytic converter. Therefore, the first $NO_x$ storage catalytic converter may be regenerated independently of the engine speed or engine load, if desired. As a result, the $NO_x$ storage catalytic converter can be regenerated over a wider time frame of engine operation when compared with prior exhaust systems.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

BRIEF DESCRIPTION OF THE DRAWINGS

FIG. 2 shows a method for operating an exhaust-gas aftertreatment system arrangement; and FIG. 3 shows another method for operation of an exhaust-gas aftertreatment system.

DETAILED DESCRIPTION

Figure 1:
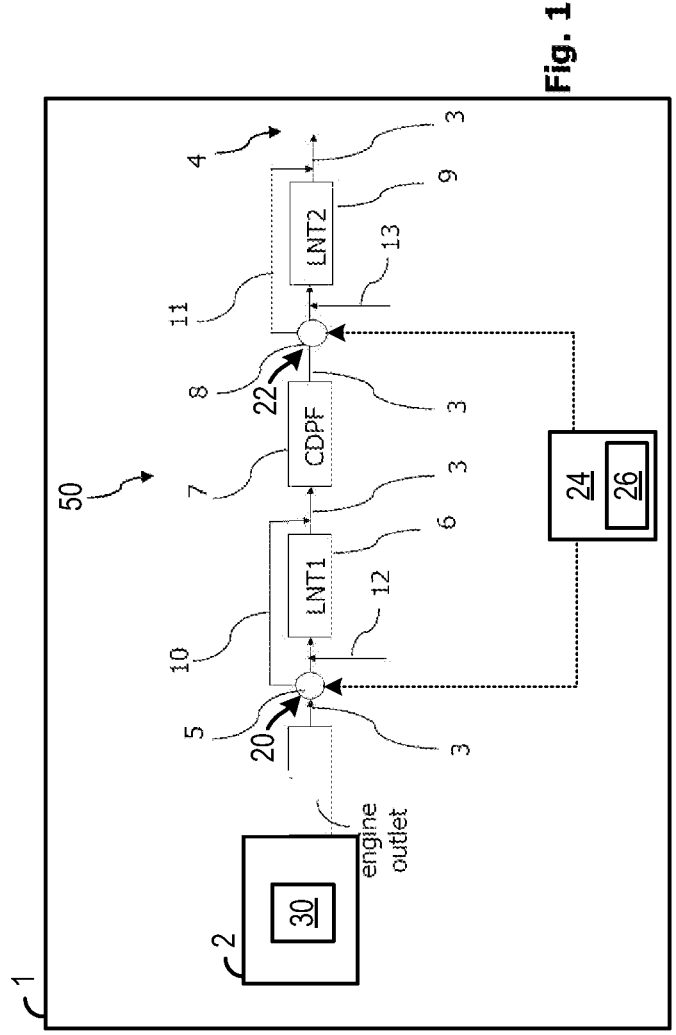
FIG. 1 shows an exemplary embodiment of an arrangement according to the invention for exhaust-gas aftertreatment for an internal combustion engine.

US 2006/0168948 A1 discloses a sequence of two $NO_x$ storage catalytic converters, wherein the first $NO_x$ storage catalytic converter is an aluminum oxide-based $NO_x$ storage catalytic converter and the second is a conventional $NO_x$ storage catalytic converter. During a desulfurization of the first $NO_x$ storage catalytic converter, the exhaust-gas stream is conducted past the second $NO_x$ storage catalytic converter through a bypass branch such that no sulfur passes to said second $NO_x$ storage catalytic converter either during normal operation or during the desulfurization of the first $NO_x$ storage catalytic converter.

In DE 196 26 837 A1, a $NO_x$ storage catalytic converter of an exhaust system of a diesel internal combustion engine is regenerated in targeted fashion under operating conditions in which there is a low $NO_x$ content in the exhaust-gas stream. In this case, the exhaust-gas stream is conducted predominantly past the $NO_x$ storage catalytic converter, and the $NO_x$ storage catalytic converter is regenerated by an injection of fuel. An oxidation catalytic converter is arranged in the downstream, re-merged part of the exhaust system. In US 2006/0213187 A1, the exhaust-gas stream is conducted successively through an oxidation catalytic converter, a particle filter, a $NO_x$ adsorber, and an SCR catalytic converter, wherein the $NO_x$ adsorber can be bypassed via a bypass line during a regeneration phase.

In the known exhaust-gas aftertreatment arrangements and methods for the reduction of $NO_x$ emissions in the applications described above, considerable additional operating costs are incurred owing to the needed provision of ammonia and additional fuel. Furthermore, whether a regeneration of the $NO_x$ storage catalytic converter is possible is dependent on the operating conditions of the internal combustion engine, in particular on the current engine speed and the current load.

The exhaust-gas aftertreatment system and methods described herein for operating an internal combustion engine and exhaust-gas aftertreatment system may address the above-mentioned disadvantages. Such operation may be achieved by the configuration of the exhaust-gas aftertreatment system and method steps described in greater detail herein.

In one example, an exhaust-gas aftertreatment system arrangement for exhaust-gas aftertreatment for an internal combustion engine, in particular for a diesel engine or a lean-burn gasoline engine is provided. The exhaust-gas aftertreatment system arrangement includes a first $NO_x$ storage catalytic converter arranged in a main exhaust branch of the exhaust tract of the internal combustion engine. A first bypass branch branches off from the main exhaust branch at a branching point upstream of the first $NO_x$ storage catalytic converter in terms of the exhaust-gas stream, which first bypass branch opens into the main exhaust branch again downstream of the first $NO_x$ storage catalytic converter and is thus connected in parallel with respect to the first $NO_x$ storage catalytic converter and bypasses the latter. At least a part of the exhaust-gas stream from the internal combustion engine can flow through the first bypass branch, which in particular has a corresponding cross section for this purpose. In order for the exhaust-gas stream to be conducted selectively through the first $NO_x$ storage catalytic converter or through the first bypass branch, or for the distribution of the exhaust-gas stream between the main exhaust branch and the first bypass branch, a corresponding device for controlling the exhaust-gas stream, for example a valve or a flap, may be provided in the bypass branch or in the main exhaust branch between the branching point and the opening-in point of the first bypass branch.

In an additional example, a second $NO_x$ storage catalytic converter may be arranged in the main exhaust branch of the exhaust tract further downstream in terms of the exhaust-gas stream, that is to say downstream of the opening-in point of the first bypass branch into the first main exhaust branch. The second $NO_x$ storage catalytic converter may be positioned indirectly or directly downstream of the first $NO_x$ storage catalytic converter in the exhaust tract, and at least a part of the exhaust-gas stream from the internal combustion engine can flow at least intermittently through said second $NO_x$ storage catalytic converter. Further exhaust-gas aftertreatment devices may be arranged in the exhaust tract, for example in the main exhaust branch downstream of the opening-in point of the first bypass branch and upstream of the second $NO_x$ storage catalytic converter or else downstream of the second $NO_x$ storage catalytic converter.

Still further in another example, the arrangement for exhaust-gas aftertreatment may also comprise a second bypass branch which branches off from the main exhaust branch downstream, in terms of the exhaust-gas stream, of the opening-in point of the first bypass branch into the main exhaust branch and upstream of the second $NO_x$ storage catalytic converter and which is thus connected in parallel with respect to the second $NO_x$ storage catalytic converter. At least a part of the exhaust-gas stream from the internal combustion engine can flow through the second bypass branch, which in particular has a corresponding cross section for this purpose. The second bypass branch may open into the main exhaust branch again downstream of the second $NO_x$ storage catalytic converter, or may run separately from said main exhaust branch. In order for the exhaust-gas stream to be conducted selectively through the second $NO_x$ storage catalytic converter or through the second bypass branch, or for the distribution of the exhaust-gas stream between the main exhaust branch, which has the second $NO_x$ storage catalytic converter, and the second bypass branch, a corresponding device for controlling the exhaust-gas stream may be provided, for example a valve or a flap in the bypass branch or in that section of the main exhaust branch which is bypassed by the second bypass branch.

The arrangement of a second $NO_x$ storage catalytic converter downstream of the opening-in point of the first bypass branch into the first main exhaust branch enables not only a particularly extensive reduction of the nitrogen oxide emissions of the internal combustion engine but also a reduction of the $NO_x$ emissions in situations or operating phases in which the first $NO_x$ storage catalytic converter is bypassed by a part of the exhaust-gas stream or by the entire exhaust-gas stream. Such bypassing may be advantageous in particular during a regeneration of the first $NO_x$ storage catalytic converter. Therefore in one example, it is made possible for the exhaust-gas aftertreatment device, or the internal combustion engine having the exhaust-gas aftertreatment device, to be operated such that purification of the exhaust-gas stream for reduction of the $NO_x$ content takes place even during a regeneration phase of the first $NO_x$ storage catalytic converter. This makes it possible in particular for a regeneration of the first $NO_x$ storage catalytic converter to be performed substantially independently of the present operating state of the internal combustion engine, and thus for example even when the internal combustion engine is not being operated at idle or in an overrun phase, and thus is not presently being operated with low nitrogen oxide emissions. Furthermore, by virtue of the fact that a bypass branch, through which at least a part of the exhaust-gas stream from the internal combustion engine can flow, is arranged in parallel with respect to the first $NO_x$ storage catalytic converter, a reduction or stoppage of the exhaust-gas flow through the first $NO_x$ storage catalytic converter during a regeneration phase is made possible, whereby the amount of oxygen flowing through said first $NO_x$ storage catalytic converter is reduced, and thus the amount of fuel needed for the regeneration of the first $NO_x$ storage catalytic converter is reduced. Finally, by virtue of the fact that a second bypass branch is provided in parallel with respect to the second $NO_x$ storage catalytic converter, it is made possible for the exhaust-gas aftertreatment device, or the internal combustion engine having the exhaust-gas aftertreatment device, to be operated such that, in a regeneration phase of the second $NO_x$ storage catalytic converter, the exhaust-gas flow through the second $NO_x$ storage catalytic converter is reduced or stopped, whereby the amount of oxygen flowing through said second $NO_x$ storage catalytic converter is reduced, and thus the amount of fuel needed for the regeneration of the second $NO_x$ storage catalytic converter is likewise reduced.

In one example, the part of the exhaust-gas stream from the internal combustion engine that flows through the first bypass branch may be controllable by a first valve. This makes it possible for an adjustable fraction of the exhaust-gas stream to be diverted past the first $NO_x$ storage catalytic converter, if desired. The first valve may be arranged at the branching point of the first bypass branch from the main exhaust branch of the exhaust tract. The first valve may be actuable by a control device such that, during a regeneration of the first $NO_x$ storage catalytic converter, the latter is bypassed by a part of the exhaust-gas stream or by the entire exhaust-gas stream. The control device may be part of an electronic engine controller of the internal combustion engine. The control device may, as engine controller, also be designed to control an additional injection of fuel into the internal combustion engine.

In a further example, the part of the exhaust-gas stream from the internal combustion engine that flows through the second bypass branch may be controllable by a second valve. This makes it possible for an adjustable fraction of the exhaust-gas stream to be diverted past the second $NO_x$ storage catalytic converter, if desired. The second valve may be arranged at the branching point of the second bypass branch from the main exhaust branch of the exhaust tract. The second valve may be actuable by a control device such that, during a regeneration of the second $NO_x$ storage catalytic converter, at most only a part of the exhaust-gas stream flows through the latter.

In one example embodiment, on the main exhaust branch of the exhaust tract, a first device for supplying fuel are arranged downstream of the branching point of the first bypass branch and upstream of the first $NO_x$ storage catalytic converter, and/or a second device for supplying fuel are arranged downstream of the branching point of the second bypass branch and upstream of the second $NO_x$ storage catalytic converter. The first and second devices for supplying fuel may for example respectively be in the form of an injection nozzle or an evaporator, and serve for the enrichment of the exhaust gas flowing through the first and second $NO_x$ storage catalytic converter respectively with fuel for the purpose of performing a regeneration of the respective $NO_x$ storage catalytic converter. The first and second devices for supplying fuel are in particular actuable by a control device such that, during a regeneration of the first or second $NO_x$ storage catalytic converter respectively, an amount of fuel is supplied which is suitable for corresponding enrichment of the exhaust gas. Said amount of fuel is lower if at least a part of the entire exhaust-gas stream from the internal combustion engine is conducted via the first or second bypass branch respectively than if the entire exhaust-gas stream were conducted through the respective $NO_x$ storage catalytic converter during the regeneration. This permits particularly effective and inexpensive operation of the exhaust-gas aftertreatment arrangement.

In one example, at least one further exhaust-gas aftertreatment device may be arranged in the exhaust tract between the first and second $NO_x$ storage catalytic converters. This permits a particularly extensive reduction of undesired exhaust-gas constituents. The at least one further exhaust-gas aftertreatment device may be arranged between the opening-in point of the first bypass branch into the main exhaust branch and the branching point of the second bypass branch. It is achieved in this way that the entire exhaust-gas stream, if appropriate after flowing through the first $NO_x$ storage catalytic converter, is conducted through the at least one further exhaust-gas aftertreatment device, thus permitting particularly complete purification of the exhaust gas.

As at least one further exhaust-gas aftertreatment device that may be arranged between the first and second $NO_x$ storage catalytic converters may include an SCR catalytic converter and/or a coated diesel particle filter (CDPF) and/or a combined filter having an SCR catalytic converter and a diesel particle filter (SDPF). Furthermore, in particular in the case of an SCR catalytic converter or an SCPF directly downstream thereof, a feed of ammonia or of an ammonia-releasing substance, for example a urea solution, may be provided. A further reduction of the $NO_x$ and/or soot emissions, and if appropriate of other pollutants contained in the exhaust gas, is made possible in this way.

A method for operating an internal combustion engine is also provided. The internal combustion engine may be a diesel engine or a lean-burn gasoline engine and may have an exhaust-gas aftertreatment system arrangement described above. The method may include flowing (e.g., conducting) a substantial majority of an exhaust-gas stream from the internal combustion engine through the first $NO_x$ storage catalytic converter in a first operating state. The method may further include, flowing a substantial majority of the exhaust-gas stream through the first bypass branch in a second operating state and regenerating the first $NO_x$ storage catalytic converter in the second operating state.

For this purpose, devices for controlling the exhaust-gas stream and for the supply of fuel, for example a first valve at the branching point of the first bypass branch and an injection nozzle arranged in the main exhaust branch upstream of the first $NO_x$ storage catalytic converter, may be actuated correspondingly by a control device. By virtue of the fact that, in the second operating state, at least a predominant part of the exhaust-gas stream is conducted through the first bypass branch and thus the exhaust-gas stream does not flow, or only a relatively small part of the exhaust-gas stream flows, through the first $NO_x$ storage catalytic converter, the amount of oxygen thus flowing through the first $NO_x$ storage catalytic converter is reduced, such that it is needed for a smaller amount of fuel to be supplied for the regeneration.

In one example, the method may further include, both in the first operating state and in the second operating state, flowing (e.g., conducting) a substantially majority of the exhaust-gas stream through the second $NO_x$ storage catalytic converter. In this way, particularly extensive purification of the exhaust-gas stream, and in particular a substantial reduction (e.g., prevention) of $NO_x$ emissions, is realized in the first operating state. In the second operating state, in which the exhaust-gas stream has bypassed the first $NO_x$ storage catalytic converter, purification of the exhaust-gas stream is performed by the second $NO_x$ storage catalytic converter. In this way, not only is it possible to achieve a particularly extensive reduction of the $NO_x$ emissions from the internal combustion engine averaged over all operating states, but it is also made possible for a regeneration of the first $NO_x$ storage catalytic converter to be performed independently of the operating state of the internal combustion engine; the regeneration is thus in particular not restricted to operating states with low $NO_x$ emissions. This makes it possible for a regeneration of the first $NO_x$ storage catalytic converter to be performed as a function of the state thereof, in particular as a function of the loading, and at a time which is desired with regard to the operation of the first $NO_x$ storage catalytic converter.

Furthermore in another example the method may further include, in a third operating state, performing regeneration of the second $NO_x$ storage catalytic converter, flowing (e.g., conducting) the substantial majority substantially of the exhaust-gas stream from the internal combustion engine through the first $NO_x$ storage catalytic converter, and flowing at least a predominant part of the exhaust-gas stream through the second bypass branch. In this way, a regeneration of the second $NO_x$ storage catalytic converter is made possible, wherein the exhaust-gas stream does not flow, or only a relatively small part of the exhaust-gas stream flows, through the second $NO_x$ storage catalytic converter. In this way, the amount of oxygen thus flowing through the second $NO_x$ storage catalytic converter is reduced, such that it is sufficient for a smaller amount of fuel to be supplied for the regeneration, if desired.

In one example embodiment, the method may further include, in the second operating state and/or third operating state, injecting additional fuel into the internal combustion engine for enrichment of the exhaust-gas stream, that is to say for generating an excess of fuel in the exhaust-gas stream. This permits a regeneration of the first and of the second $NO_x$ storage catalytic converter without the need for additional devices for supplying fuel to be provided in the exhaust tract, or if devices for supplying fuel are provided in the exhaust tract, the regeneration can be improved. In both cases, a predominant part of the exhaust-gas stream, but not the entire exhaust-gas stream, is conducted through the first or second bypass line respectively, such that there is a reduced flow through the $NO_x$ storage catalytic converter to be regenerated, whereby the exhaust gas with the fuel that has been additionally injected in the internal combustion engine passes into the respective $NO_x$ storage catalytic converter.

As shown by way of example in FIG. 1, symbolically in the form of a block diagram, the exhaust tract 1 of an internal combustion engine 2. The internal combustion engine 2 may be a diesel engine, in one example. The exhaust tract 1 includes a main exhaust branch 3 which runs from the outlet of the engine 2 ("engine outlet") to an outlet 4 of the exhaust tract 1, and into which there are incorporated, in succession, a first valve 5, a first $NO_x$ storage catalytic converter 6 (LNT1), a coated diesel particle filter 7, (CDPF), a second valve 8 and a second $NO_x$ storage catalytic converter 9 (LNT2). The main exhaust branch may be more generally referred to as an exhaust conduit. However, it will be appreciated that the coated diesel particulate filter 7 may be more generally referred to as an emission control device. Additionally or alternatively the emission control device 7 may include an SCR catalytic converter. Further in one example, the engine outlet may be an exhaust manifold outlet or an exhaust conduit outlet. Additionally, the engine outlet is in fluidic communication with at least one cylinder 30 in the engine 2. The exhaust tract 1, main exhaust branch 3, first valve 5, first $NO_x$ storage catalytic converter 6, coated diesel particle filter 7, second valve 8, second $NO_x$ storage catalytic converter 9, first bypass branch 10, second bypass branch 11, control device 24, and/or injection nozzles (12 and 13) may be included in an exhaust-gas aftertreatment system arrangement 50. However in other examples, the exhaust-gas aftertreatment system arrangement 50 may include additional or alternative components. It will be appreciated that the exhaust-gas aftertreatment system arrangement may be more generally referred to as an exhaust-gas aftertreatment system.

As shown in FIG. 1, there is connected in parallel with respect to the first $NO_x$ storage catalytic converter 6 a first bypass branch 10 which branches off from the main exhaust branch 3 at a branching point 20 upstream of the first $NO_x$ storage catalytic converter 6 and which opens into the main exhaust branch 3 again downstream of the first $NO_x$ storage catalytic converter 6. Correspondingly, there is connected in parallel with respect to the second $NO_x$ storage catalytic converter 9 a second bypass branch 11 which branches off from the main exhaust branch 3 at a branching point 22 upstream of the second $NO_x$ storage catalytic converter 9 and which opens into the said main exhaust branch again downstream of the second $NO_x$ storage catalytic converter 9. The valves 5, 8 are arranged at the branching points of the two bypass branches 10, 11. Said valves are actuated by a control device 24 such that, in each case, a controllable fraction of the entire exhaust-gas stream passing from the diesel engine 2 is conducted, via the first and second bypass branch 10, 11 respectively, past the respective $NO_x$ storage catalytic converter 6, 9 and is introduced into the main exhaust branch 3 again downstream. The control device 24 may be in electronic communication with the valves (5 and 8). However, other types of a control connection between the control device and the valves have been contemplated, such as pneumatic connection or hydraulic connection for example. The control device 24 may include a controller 26. It will be appreciated that the controller 26 may include instructions stored in memory executable by a processor to implement the methods, control strategies, etc., described herein, in one example.

The coated diesel particle filter 7 is arranged between the opening-in point of the first bypass branch 10 and the branching point of the second bypass branch 11, with the entire exhaust-gas stream flowing through said coated diesel particle filter. Downstream of the opening-in point of the second bypass branch 11 into the main exhaust branch 3, said main exhaust branch may end at an outlet 4 of the exhaust tract, or there may be arranged therein further exhaust-gas aftertreatment devices, for example for the reduction of other pollutants or for noise reduction (not illustrated). Likewise not illustrated are further devices, such as an exhaust-gas turbine or sensors, that may be provided in the exhaust tract.

Injection nozzles 12, 13 or other suitable fuel injection devices for the injection of fuel into the main exhaust branch 3 are arranged upstream of the first and second $NO_x$ storage catalytic converters 6, 9 respectively. The injection nozzles 12, 13 are likewise actuable by the control device. Thus, the injection nozzles or other fuel injection devices are configured to inject fuel into the main exhaust branch.

In one example, in a first operating state, which may correspond to normal operation, both of the valves 5, 8 are closed, such that the entire exhaust-gas stream from the diesel engine 2 is conducted through both $NO_x$ storage catalytic converters 6, 9 and through the coated diesel particle filter 7. This results in an extensive reduction of the pollutants, in particular of the nitrogen oxides, contained in the exhaust gas. These are gradually accumulated in the first $NO_x$ storage catalytic converter 6 and also in the second $NO_x$ storage catalytic converter 9. In the normal state, an excess of oxygen may prevail in the exhaust gas.

If, the first $NO_x$ storage catalytic converter 6 is loaded beyond a desirable level regeneration of the $NO_x$ storage catalytic converter may be implemented. Regeneration may include generating an excess of fuel locally such that the oxygen content in the exhaust gas lies below approximately 1%. For this purpose, the valve 5 may be partially opened, such that the predominant fraction of the exhaust-gas stream flows through the first bypass branch 10. In one example a predominant fraction or substantial majority may include a percentage of the total exhaust gas greater than 50%. The remaining exhaust-gas stream may be flowed through the first $NO_x$ storage catalytic converter 6, and thus also the overall amount of oxygen flowing through the latter, are therefore low. The injection nozzle 12 is configured to inject fuel into the exhaust gas flowing through the first $NO_x$ storage catalytic converter 6, wherein the amount of fuel desired for generating an excess of fuel is correspondingly reduced. The injection nozzle 12 may be more generally referred to as a fuel injection device. Furthermore, the hydrocarbons (HC) supplied with the fuel are converted more efficiently owing to the reduced flow speed, whereby the amount of fuel needed for regeneration is reduced yet further. During the regeneration of the first $NO_x$ storage catalytic converter 6, the second valve 8 is closed, such that the entire exhaust-gas stream is conducted through the second $NO_x$ storage catalytic converter 9, and emissions of nitrogen oxides are reduced (e.g., prevented).

Accordingly, when a regeneration of the second $NO_x$ storage catalytic converter 9 is to be performed, the valve 8 is partially opened, such that the predominant fraction of the exhaust-gas stream flows through the second bypass branch 11. The injection nozzle 13 is configured to injection fuel into the exhaust gas flowing through the second $NO_x$ storage catalytic converter 9, wherein the amount of fuel needed for generating an excess of fuel is likewise reduced. The injection nozzle 13 may be more generally referred to as a fuel injection device. During the regeneration of the second $NO_x$ storage catalytic converter 9, the first valve 5 may be closed, enabling the exhaust gas to be purified with regard to nitrogen oxides contained therein by the first $NO_x$ storage catalytic converter 6.

The valves 5, 8 and the injection nozzles 12, 13 may be actuated correspondingly by the control device for the purpose of carrying out the regeneration of the first and of the second $NO_x$ storage catalytic converter 6, 9 respectively. Here, the control may be performed on the basis of the respective loading taking into consideration those operating conditions of the $NO_x$ storage catalytic converters 6, 9, for example the respective temperatures, which are suitable for a regeneration, wherein furthermore, the control is performed such that the first and second $NO_x$ storage catalytic converters 6, 9 are regenerated at different times. Regenerating the first and second $NO_x$ storage catalytic converters 6, 9 at different times is also advantageous because the two $NO_x$ storage catalytic converters 6, 9 exhibit different warm-up curves owing to their different positions in the exhaust tract 1.

Since the excess of fuel needed for carrying out the regeneration is generated by an injection of fuel in the exhaust tract 1, the regeneration can be performed independently of the present engine speed and the present engine load, if desired. Thus, regeneration is in particular even possible at high engine load as well as at low engine load, which is generally not achievable if an excess of fuel is generated by an additional injection of fuel in the engine. It is however also possible for an additional injection of fuel in the diesel engine 2 to be provided in addition to the described supply of fuel in the exhaust tract.

FIG. 2 shows a method 200 for operating an exhaust-gas aftertreatment system arrangement, the method. The method 200 may be implemented via the exhaust-gas aftertreatment system arrangement and internal combustion engine discussed above with regard to FIG. 1. However, in other examples the method 200 may be implemented via other suitable exhaust-gas aftertreatment system arrangements and/or internal combustion engines.

At 202 the method flowing a majority of an exhaust-gas stream from an engine through a first $NO_x$ storage catalyst in a main exhaust branch. Next at 204 the method includes flow the majority through a second $NO_x$ storage catalyst positioned in the main exhaust branch downstream of the first $NO_x$ storage catalyst.

Next at 206 the method includes flowing the majority through a first bypass branch upstream of the first $NO_x$ storage catalyst and which opens into the main exhaust branch downstream of the first $NO_x$ storage catalyst and upstream of a second $NO_x$ storage catalyst while regenerating the first $NO_x$ storage catalyst.

At 208 the method includes injecting additional fuel into the internal combustion engine. Next at 210 the method includes flowing the majority through the first $NO_x$ storage catalyst. At 212 the method includes flowing a substantial majority of the exhaust-gas stream through a second bypass branch while regenerating the second $NO_x$ storage catalyst In one example, steps 202-204 may be implemented during a first operating state, steps 206-208 may be implemented during a second operating state, and steps 210-212 may be implemented during a third operating state. It will be appreciated that the first operating state may be when the first $NO_x$ storage catalytic converter and the second $NO_x$ storage catalytic converter are loaded below a threshold value and the second operating state may be when the first $NO_x$ storage catalytic converter is loaded above a threshold value and the second $NO_x$ storage catalytic converter is loaded below a threshold value. Furthermore, the third operating state may be when the first $NO_x$ storage catalytic converter is loaded below a threshold value and the second first $NO_x$ storage catalytic converter is loaded above a threshold value. It will be appreciated that the aforementioned loading is $NO_x$ loading. However, FIG. 3 shows a method 300 for operating an exhaust-gas aftertreatment system arrangement, the method. The method 300 may be implemented via the exhaust-gas aftertreatment system arrangement and internal combustion engine discussed above with regard to FIG. 1. However, in other examples the method 300 may be implemented via other suitable exhaust-gas aftertreatment system arrangements and/or internal combustion engines.

At 302 the method include flowing an exhaust gas stream through a first $NO_x$ storage catalytic converter positioned in an exhaust conduit and through a second $NO_x$ storage catalytic converter positioned in the exhaust conduit downstream of the first $NO_x$ storage catalytic converter. Next at 304 the method includes substantially inhibiting exhaust gas flow through a first bypass branch opening into the exhaust conduit upstream and downstream of the first $NO_x$ storage catalytic converter and a second bypass branch opening into the exhaust conduit upstream and downstream of the second $NO_x$ storage catalytic converter. Steps 302-304 are implemented during a first operating condition.

At 306 the method includes flowing a portion of the exhaust gas stream through the first bypass branch and at 308 the method includes substantially inhibiting exhaust gas flow through the second bypass branch. Next at 310 the method includes injecting fuel into the exhaust conduit upstream of the first $NO_x$ storage catalytic converter. Steps 306-310 are implemented during a second operating condition. It will be appreciated that the portion in step 306 may be greater than 50% of the exhaust gas stream.

At 312 the method includes flowing a portion of the exhaust gas stream through the second bypass branch and at 314 the method includes substantially inhibiting exhaust gas flow through the first bypass branch. It will be appreciated that the portion in step 312 may be greater than 50% of the exhaust gas stream.

At 316 the method includes injecting fuel into the exhaust conduit upstream of the second $NO_x$ storage catalytic converter and downstream of the first $NO_x$ storage catalytic converter. Steps 312-316 are implemented during a third operating condition. In one example, the first operating condition include a condition where the $NO_x$ loading in first $NO_x$ storage catalytic converter is below a threshold value and the second operating condition includes a condition where the $NO_x$ loading in first $NO_x$ storage catalytic converter is above the threshold value. Still further in another example, the third operating condition includes a condition where the $NO_x$ loading in second $NO_x$ storage catalytic converter is above a threshold value and the first and second operating conditions may include a condition where the second $NO_x$ storage catalytic converter is below a threshold value. Thus it will be appreciated that the aforementioned operating conditions are different from one another.

The method described above for operating a vehicle is not limited to the measures and embodiments disclosed herein, but naturally also encompasses similarly acting measures and embodiments. Furthermore, a person skilled in the art understands that, although the invention has been described by way of example with reference to one or a plurality of embodiments, it is not limited to the disclosed embodiments and that alternative embodiments could be constructed without departing from the scope of protection of the invention as defined by the accompanying claims.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An exhaust-gas aftertreatment system arrangement for an internal combustion engine, comprising:
    an exhaust tract receiving an exhaust-gas stream from the internal combustion engine including:
        a main exhaust branch with a first $NO_x$ storage catalytic converter positioned therein;
        a first bypass branch branching off from the main exhaust branch at a branching point upstream of the first $NO_x$ storage catalytic converter and which opens into the main exhaust branch downstream of the first $NO_x$ storage catalytic converter and through which at least a part of the exhaust-gas stream can flow;
        a second $NO_x$ storage catalytic converter arranged in the main exhaust branch downstream of an opening-in point of the first bypass branch into the main exhaust branch;
        a second bypass branch branching off from the main exhaust branch at a branching point downstream of the opening-in point of the first bypass branch into the main exhaust branch and upstream of the second $NO_x$ storage catalytic converter and through which at least a part of the exhaust-gas stream can flow; and
        a coated diesel particle filter arranged between the first and second $NO_x$ storage catalytic converters.

2. The exhaust-gas aftertreatment system arrangement of claim 1, where the exhaust tract further comprises a first valve positioned in the first bypass branch and configured to control an amount of exhaust gas flowing through the first bypass branch.

3. The exhaust-gas aftertreatment system arrangement of claim 1, where the exhaust tract further comprises a second valve positioned in the second bypass branch and configured to control an amount of exhaust gas flowing through the second bypass branch.

4. The exhaust-gas aftertreatment system arrangement of claim 1, where the exhaust tract further comprises at least one of a first fuel injection device arranged downstream of the branching point of the first bypass branch and upstream of the first $NO_x$ storage catalytic converter and a second fuel injection device arranged downstream of the branching point of the second bypass branch and upstream of the second $NO_x$ storage catalytic converter.

5. The exhaust-gas aftertreatment system arrangement of claim 1, where the exhaust tract further comprises an SCR catalytic converter arranged between the first and second $NO_x$ storage catalytic converters.

6. A method, comprising:
    selectively flowing an exhaust-gas stream from an engine through a first $NO_x$ storage catalyst in a main exhaust branch; and
    while regenerating the first $NO_x$ storage catalyst, flowing at least a portion of the exhaust-gas stream through a first bypass branch upstream of the first $NO_x$ storage catalyst and which opens into the main exhaust branch downstream of the first $NO_x$ storage catalyst and upstream of a second $NO_x$ storage catalyst, and flowing the exhaust gas stream from the first $NO_x$ storage catalyst and the first bypass branch through the second $NO_x$ storage catalyst.

7. The method of claim 6, further comprising, while regenerating the second $NO_x$ storage catalyst, flowing the exhaust-gas stream through the first $NO_x$ storage catalyst, and flowing at least a portion of the exhaust-gas stream through a second bypass branch.

8. The method of claim 6, further comprising injecting additional fuel into an internal combustion engine while regenerating the first $NO_x$ storage catalyst.

9. A method for operating an exhaust-gas aftertreatment system arrangement, the method comprising:
during a first operating condition, flowing an exhaust gas stream through a first $NO_x$ storage catalytic converter positioned in an exhaust conduit and through a second $NO_x$ storage catalytic converter positioned in the exhaust conduit downstream of the first $NO_x$ storage catalytic converter, and substantially inhibiting exhaust gas flow through a first bypass branch opening into the exhaust conduit upstream and downstream of the first $NO_x$ storage catalytic converter and a second bypass branch opening into the exhaust conduit upstream and downstream of the second $NO_x$ storage catalytic converter; and
during a second operating condition, flowing a portion of the exhaust gas stream through the first bypass branch and substantially inhibiting exhaust gas flow through the second bypass branch.

10. The method of claim 9, further comprising, during the second operating condition, injecting fuel into the exhaust conduit upstream of the first $NO_x$ storage catalytic converter.

11. The method of claim 9, further comprising, during a third operating condition, flowing a portion of the exhaust gas stream through the second bypass branch and substantially inhibiting exhaust gas flow through the first bypass branch.

12. The method of claim 11, further comprising, during the third operating condition, injecting fuel into the exhaust conduit upstream of the second $NO_x$ storage catalytic converter and downstream of the first $NO_x$ storage catalytic converter.

13. The method of claim 11, where the first operating condition is when $NO_x$ loading in the first $NO_x$ storage catalytic converter is below a threshold value and the second operating condition is when the $NO_x$ loading in the first $NO_x$ storage catalytic converter is above the threshold value.

14. The method of claim 9, wherein during the second operating condition, a remaining portion of the exhaust gas stream flows through the first $NO_x$ storage catalytic converter, and both the portion and remaining portion of the exhaust gas stream flows through the second $NO_x$ storage catalytic converter.

15. The method of claim 14, wherein during the second operating condition, both the portion and remaining portion of the exhaust gas stream flows through a particulate filter positioned between the first and second $NO_x$ storage catalytic converters.

\* \* \* \* \*